Nov. 16, 1965 R. FAVRE 3,218,507
COUPLING SYSTEM FOR THE STAGES OF A BIDIRECTIONAL PULSE COUNTER
Filed July 22, 1963
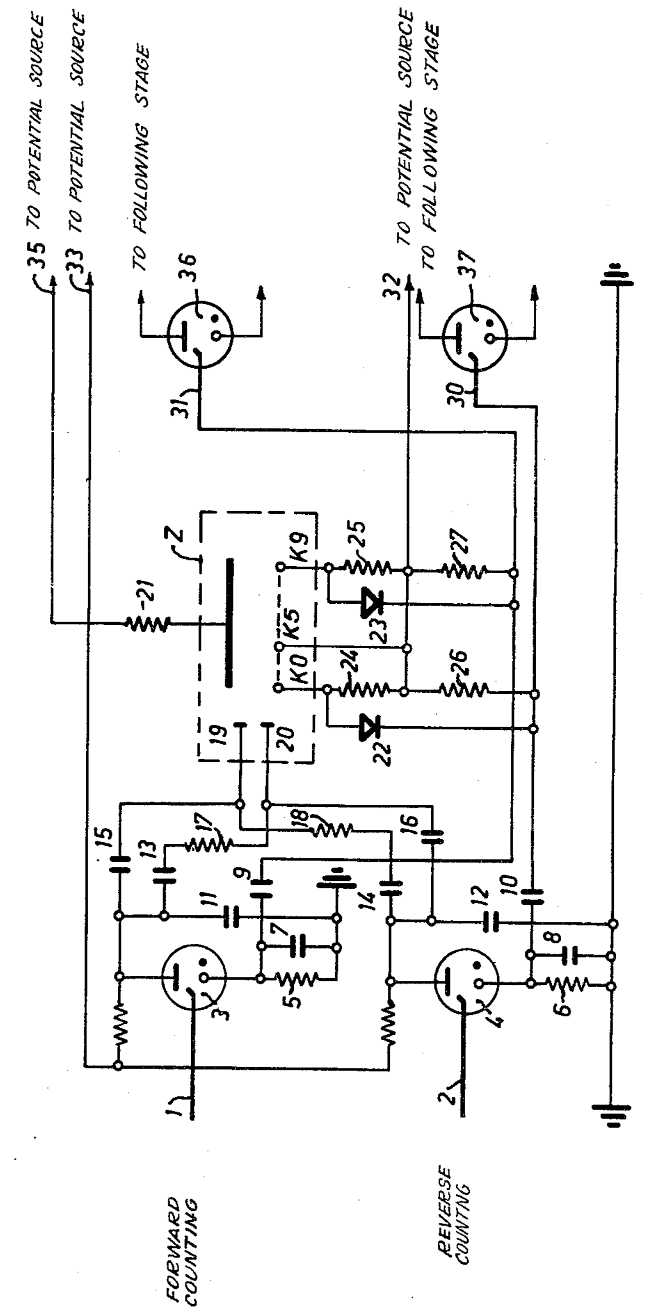

3,218,507
Patented Nov. 16, 1965

3,218,507

COUPLING SYSTEM FOR THE STAGES OF A BIDIRECTIONAL PULSE COUNTER

Robert Favre, Lausanne, Switzerland, assignor to Manufacture des Montres, Universal Perret Frères S.A., Geneva, Switzerland, and Fabriques Movado, La Chaux-de-Fonds, Switzerland, both firms Filed July 22, 1963, Ser. No. 296,841
Claims priority, application Switzerland, July 21, 1962, 8,739/62
5 Claims. (Cl. 315—84.6)

Counters of electric pulses operating in both directions may count or subtract, that is count back, according to the pulses applied thereto. Generally speaking, bidirectional counters include two input tracks corresponding respectively to counting forwardly and to counting back. Generally speaking also, pulse counters are provided with several operative stages coupled in series. In counters mechanically storing information, the series coupling is generally of a mechanical type, whereas in counters storing information through non-mechanical means and including for instance electronic tubes, gas-filled tubes, semi-conductive devices, magnetic memories and the like, coupling between the stages is generally obtained through electric pulses.

Each operative stage is defined by its capacity or the maximum number of pulses for which it can be responsible. Each stage can show a number of different conditions which is at least equal to its capacity. The condition corresponding to the absence of a pulse will be termed the starting condition, whereas that corresponding to its maximum capacity will be termed a saturated condition.

Various types of bidirectional operative stages are known, more particularly in the shape of rings having a capacity *n* and constituted by *n* gas-filled tubes of which one is conductive for each of *n* conditions. The decatron, forming a gas-filled counter tube having generally a decimal base, is an improvement of such a system.

The difficulty of bidirectional coupling appears therefore only for multistage counters. Each following or subordinate stage has to be fed through the correct track for a predetermined transistional condition of the preceding stage.

The invention has for its object a system for coupling in series the stages of a bidirectional counter of electric pulses provided with a forward counting and a counting back input track.

According to the invention, the input pulses for the subordinate or lower stages are separated into passive pulses the level of which is lower than a predetermined threshold and active pulses the level of which is higher than the threshold, said active pulses being alone incorporated with the subordinate stage considered. The input pulses for any subordinate or next successive stage being generated by the active input pulses of the preceding stage and forming active pulses only when they register with a characteristic voltage governing the integration of the pulses with the subordinate stage considered.

The single figure of the accompanying drawing illustrates by way of example an embodiment of the invention as applied to a decatron tube. The decatron tube Z illustrated includes ten cathodes K0 to K9 with an intermediate cathode K5 illustrated. An anode is connected with the wire 35, to which a potential is applied, through a resistance 21. Two systems of transfer electrodes 19 and 20 are provided in the tube Z. Two input tracks 1 and 2 feed the starting anodes of corresponding or respective gas-filled discharge devices or triode tubes 3 and 4. These tubes are normally locked and become conductive during a very short time for each positive pulse of a sufficient amplitude applied to their respective starting electrodes. The locking of the tubes after their discharge is obtained by the well-known action of the capacitors 11 and 12 respectively.

Each discharge is thus defined by a negative anodic pulse of a potential between 150 and 200 volts. Assuming a positive pulse of a sufficient amplitude is fed through the track 1, the tube 3 produces an anodic discharge pulse which is transmitted directly through the capacitor 15 to the transfer electrode 19. The pulse reaches the transfer electrode 20 only with a predetermined delay by reason of a resistance 17 loaded by the capacitors 16 and 12. The decatron progresses then by one unit. It is an easy matter to understand that, if an input pulse is applied to the track 2, the phase shifting between the pulses applied to the transfer electrodes 19 and 20 is reversed, which leads to a receding or reverse counting of the decatron by one unit.

Since the discharge of the tubes 3 and 4 produces a negative anodic pulse, it may also produce a positive cathodic pulse. The amplitude of the pulse of each tube 3, 4, is defined chiefly by the capacity of the corresponding condenser 7 or 8 and its duration is defined by the corresponding resistance 5 or 6. Each positive pulse of a selected amplitude of about 35 volts is shunted through a condenser 9 or 10, as the case may be, to feed the starting electrodes 30 and 31 of the corresponding input tubes 36, 37 of the following stage. The biasing of the starting electrodes when inoperative is tapped off the cathodes K0 and K9 which are loaded by the resistances 24 and 25 and feed the electrodes through the diodes 22 and 23. The resistors 26, 27 allow the capacitors 9, 10 respectively to discharge during extinction of the corresponding gas-filled triode. Moreover, these two resistors 26, 27 connect the starter electrodes 30, 31 with a potential lead 32 after the corresponding triode 3, 4 has been extinguished and current flow has ceased. The potential lead 32 is likewise connected to the intermediate cathodes such as K5. Moreover, the intermediate cathodes, not shown, are connected to a potential between the extreme potentials applied to the end cathode K0 and K9 in the conductive state. The conductor 32 and conductors 33 and 35 are each connected to a potential source, not shown, for applying potential to the counter stages as shown.

Assuming the cathode K0 is inoperative, a positive pulse fed by the condenser 10 is then insufficient for the energization of the starting electrode 30. If, in contradistinction, K0 is ignited, there appears a preliminary biasing by thirty to thirty-five volts on the starting electrode 30 which may become operative under the action of a positive pulse transmitted by the condenser 10. The pulse fed through the track 2 makes the first and the second decatron recede or count backward.

Similarly, it can be shown that a counting pulse is transmited to the following stage only if K9 is ignited. In brief, in the particular case considered, a counting pulse is fed to the following stage only when the discharge is shifted from K9 to K0 whereas a counting back pulse is transmitted only when the discharge is shifted from K0 to K9 in conformity with the generally allowed conditions for a multistage bidirectional counter. But, obviously, any other combination may be obtained by a suitable selection of the preliminary biasing cathode.

The bidirectional counter according to the invention may be applied advantageously for many automation and the like problems.

What I claim is:

1. In a bidirectional electric pulse counter including a number of successive stages connected to be shifted forwardly and rearwardly through a sequence of counts between two terminal counts, a pulse forward counting track and a pulse reverse counting track feeding electric pulses from the rearmost into the foremost of any two successive foremost and rearmost stages, a coupling system between any two successive stages comprising discriminating means in each track between said stages including means connecting said stages in common with said discriminating means to stop input pulses out of the rearmost stage and having a voltage below a predetermined threshold value and to allow the passage of active pulses out of said rearmost stage into the foremost stage for operation thereof and into the corresponding track between the foremost stage and the next succeeding stage in the counter, means whereby said foremost stage produces upon reaching a terminal count a characteristic voltage and applies it to the track corresponding to a count for which said terminal count is the final count in said foremost stage, the superposition of said characteristic voltage over the active pulse voltage in last-mentioned track producing a voltage above the threshold value for the discriminating means in said next succeeding stage.

2. In a bidirectional electric pulse counter including a number of successive stages connected to be shifted forwardly and rearwardly through a sequence of counts between two terminal counts, a pulse forward counting track and a pulse reverse counting track feeding electric pulses from the rearmost into the foremost of any two successive foremost and rearmost stages, a coupling system between any two successive stages comprising a gas-filled tube including a starting electrode fed by each track between said stages and adapted to stop the input pulses out of the rearmost stage and having a voltage below a predetermined threshold value, a cathodic circuit controlled by said tube, dual discharge circuits fed by said cathodic circuit and adapted to provide a short-lasting discharge each time the voltage of its starting electrode rises above a threshold discriminating value, means for tapping pulses off said dual discharge circuits to feed said pulses respectively into the foremost stage for operation thereof and into the corresponding track between the foremost stage and the next succeeding stage in the counter, means whereby said foremost stage produces upon reaching a terminal count a characteristic voltage and feeds the latter into the track corresponding to the count procedure for which said terminal count is the final count in said foremost stage, the superposition of said characteristic voltage over the active pulse voltage in last-mentioned track producing a voltage above the threshold value for the discriminating means in said next succeeding stage.

3. In a bidirectional electric pulse counter including a number of successive stages connected to be shifted forwardly and rearwardly through a sequence of counts between two terminal counts, a pulse forward counting track and a pulse reverse counting back track feeding electric pulses from the rearmost into the foremost of any two successive foremost and rearmost stages, a coupling system between any two successive stages comprising discriminating means inserted in each track between said stages including means connecting said stages in common with said discriminating means to stop the input pulses out of the rearmost stage and having a voltage below a predetermined threshold value and to allow the passage of active pulses out of said rearmost stage into the foremost stage for operation thereof and into the corresponding track between the foremost stage and the next succeeding stage, a decatron in the foremost stage including a plurality of cathodes fed in a sequence corresponding to the track operative by the active pulses from the discriminating means, a cathode circuit for each cathode, a resistance in each cathodic circuit, and means whereby the decatron operates the foremost stage, and means whereby the cathodic circuit for the terminal cathode when operative applies a characteristic voltage to the track corresponding to the count for which said terminal cathode corresponds to the final count in said foremost stage, the superposition of said characteristic voltage over the active pulse voltage in last-mentioned track producing a voltage above the threshold value for the discriminating means in said next succeeding stage.

4. In a bidirectional electric pulse counter including a number of successive stages connected to be shifted forwardly and rearwardly through a sequence of count between two terminal counts, a pulse forward counting track and a pulse reverse counting track feeding electric pulses from the rearmost into the foremost of any two successive foremost and rearmost stages, a coupling system between any two successive stages comprising discriminating means inserted in each track between said stages including means connecting said stages in common with said discriminating means to stop the input pulses out of the rearmost stage and having a voltage below a predetermined threshold value and to allow passage of active pulses out of said rearmost stage into the foremost stage for operation thereof and into the corresponding track between the foremost stage and the next succeeding stage, a plurality of gas-filled tubes in the foremost stage the number of which corresponds to the numeric count capacity of the foremost stage and of which one is adapted to be ignited for each operative condition of said stage to control the latter, means feeding the successive pulses from the rearmost stage through the operative track into the successive tubes, a cathodic circuit for each tube, a resistance in each cathodic circuit, and means whereby the tubes operate the foremost stage, and means whereby the cathodic circuit for the terminal cathode when operative feeds a characteristic voltage into the track corresponding to the count for which said terminal tube corresponds to the final count in said foremost stage, the superposition of said characteristic voltage over the active pulse voltage in last-mentioned track producing a voltage above the threshold value for the discriminating means in said next succeeding stage.

5. In a bidirectional electric pulse counter including a number of successive stages connected to count forwardly and rearwardly each through a count between two terminal counts, a pulse forward counting track and a pulse reverse counting track applying electric pulses from the rearmost into the foremost of any two successive foremost and rearmost stages, each stage comprising a number of counting elements, including two end elements and the activation of which represents the one or the other of said terminal counts, said counting elements being connected to said forward and said reverse counting track and successively activated by said electric pulses in the forward or reverse counting direction in dependence upon whether a forward counting pulse or reverse counting pulse is applied through the tracks, coupling means between any two successive stages comprising a threshold circuit inserted in each track between said stages, all said counting elements of each stage including means connecting said elements in common with the threshold circuits, means connecting said threshold circuits to stop input pulses leaving the rearmost stage with a voltage lower than a predetermined threshold value and to allow passage of the active pulses from said rearmost stage into the foremost stage for activation of said counting elements to transmit an electrical signal into the corresponding track between the foremost stage and the next succeeding stage, the value of said electrical signal being less than said threshold value, both the end elements of said counting elements including means to produce, when activated, an additional potential in the track corresponding to the counting procedure, the superposition of said potential over said signal in the last-mentioned track producing a voltage above the threshold value in the corresponding threshold circuit of said next succeeding stage.

References Cited by the Examiner

UNITED STATES PATENTS 3,168,677 2/1965 Somlyody ---------- 315—84.6

DAVID J. GALVIN, *Primary Examiner.*

ARTHUR GAUSS, *Examiner.*